No. 729,131. PATENTED MAY 26, 1903.
F. H. CHASE.
WHEEL TIRE.
APPLICATION FILED AUG. 4, 1902.
NO MODEL.
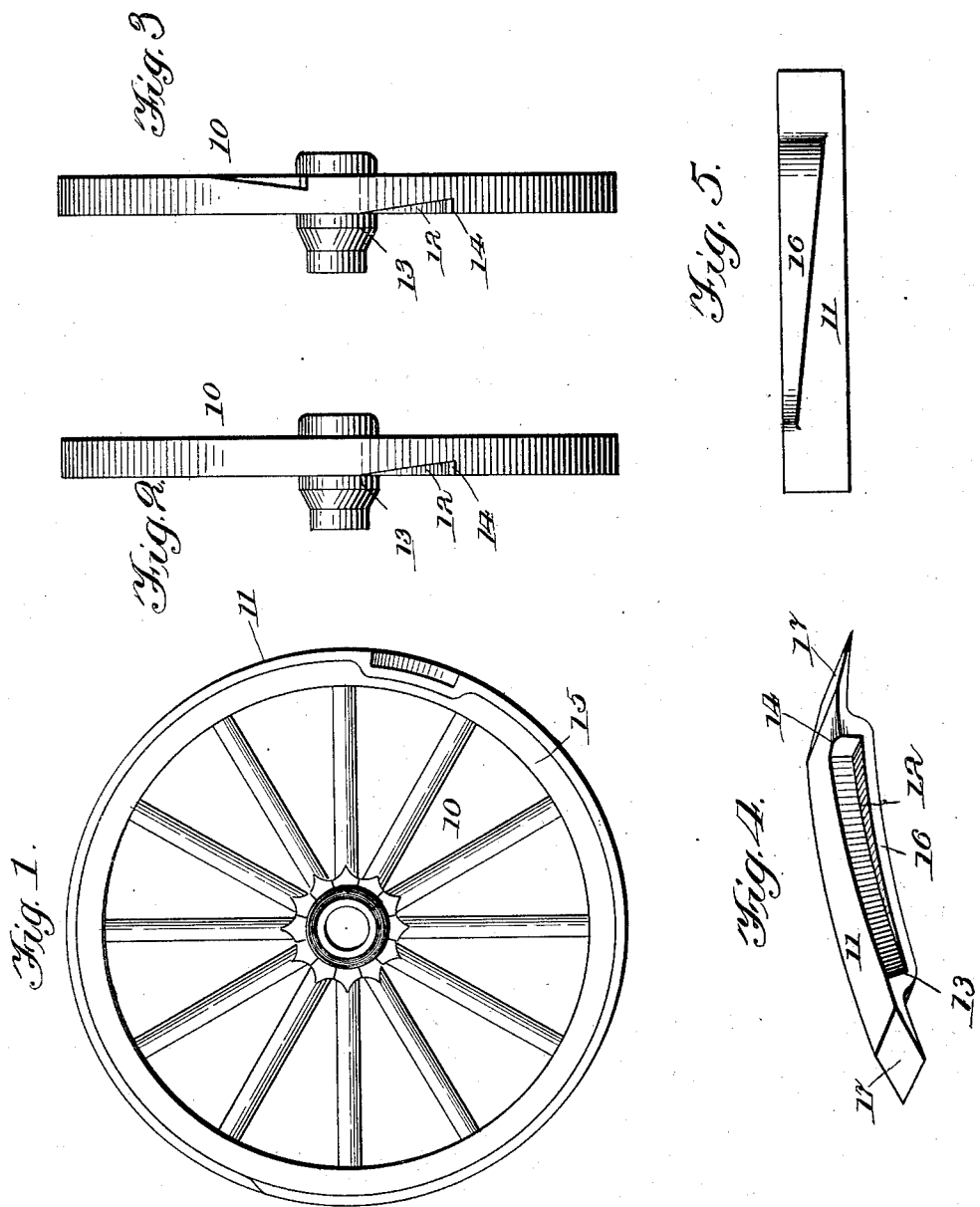

No. 729,131. Patented May 26, 1903.

UNITED STATES PATENT OFFICE.

FRANK H. CHASE, OF CHICAGO, ILLINOIS.

WHEEL-TIRE.

SPECIFICATION forming part of Letters Patent No. 729,131, dated May 26, 1903.

Application filed August 4, 1902. Serial No. 118,309. (No model.)

*To all whom it may concern:*

Be it known that I, FRANK H. CHASE, a citizen of the United States, residing at Chicago, in the county of Cook and State of Illinois, have invented certain new and useful Improvements in Wheel-Tires, of which the following is a specification.

This invention relates to novel improvements in wheel-tires, and while it is particularly adapted for heavy draft-vehicles it can be employed with equally good results on light wagons, carriages, and other light vehicles, and is also adapted for use on any kind of wheeled vehicles.

The object of the invention is to enable a vehicle which has been traveling on a car-track or in ruts to turn out and leave the rails without sliding, which is injurious to the vehicle and often results in loosening the spokes and breaking the wheel.

Another object of the invention is to enable the vehicle to leave the car-track or ruts by turning at a slight angle instead of being required to turn so far, as is customary at the present time.

With these and other ends in view the invention contemplates providing a tire with one or more notches or recesses on one or both edges to accommodate the rail when the wheel is turned and enable the wheel to leave the rail at once without sliding.

In the accompanying drawings I have illustrated one way in which the invention may be embodied, and referring thereto, Figure 1 is a side elevation of a wheel, showing the invention. Fig. 2 is an end elevation of the wheel shown in Fig. 1. Fig. 3 is an end elevation of a wheel having the tire provided with a recess on each side edge thereof. Fig. 4 is a perspective view looking at the outer face of a tire-section embodying the invention. Fig. 5 is a plan view of the under side of the tire-section shown in Fig. 4.

Like numerals of reference indicate corresponding parts in the several figures, and referring thereto, 10 designates a wheel on which a tire 11 embodying the invention is shrunk in any suitable manner. The tire is provided with a notch or recess 12 of approximately the same depth throughout and located in a depressed section at its edge, said recess beginning at a point 13 on the outer edge of the tire and extending forwardly and inwardly a suitable distance and provided, preferably, with an abrupt shoulder 14 at the front thereof. The recess may extend at its forward end, its widest point, approximately one-third of the distance across the face of the tire; but the exact size and character of the recess are not fixed and may be varied as found desirable to comply with different conditions. The recess may be struck up or formed in any way in the tire, and the felly 15 is suitably cut out to accommodate the bottom 16 of the recess.

It will be observed that I do not weaken the wheel where the recess is provided, because the bottom of the recess is integrally connected with the tire and makes the tire and the wheel as strong and substantial at this point as at any other. The juncture of the forward end of the bottom 16 of the recess, with the tire at the shoulder 14, serves to strengthen and rigidly support said shoulder, which receives the greatest wear.

My invention may be embodied in tires when they are first made, or a tire-section as shown in Fig. 4 may be provided of sufficient length to embody the invention and adapted to be inserted in place of a section cut out of an ordinary tire in actual use. Such a tire-section would be provided with beveled ends 17, whereby it could be readily welded to the ends of the tire.

It will be sufficient in most cases to provide the forward wheels of a vehicle with tires recessed on their outer edges; but in some instances it may be desirable to provide one or more recesses on both side edges of the tires of the rear wheel, and these recesses may be arranged adjacent to each other, as shown in Fig. 3, or they could just as well be disposed at opposite positions or otherwise.

It will be readily understood from the foregoing description and the drawings that when it is desired to turn out from a railway-track where the wheels have been traveling in grooves or depressions in the rails it will only be necessary to turn the horses or steer the vehicle very slightly to the side, so that the rail on that side in which the vehicle is to turn will be caused to enter the recess in the tire, and when the shoulder 14 engages the rail the wheel will be wholly lifted on the rail out of the groove or depression therein.

The use of my invention will effectually overcome and prevent the wheels from grinding and scraping on the rails and avoid the twisting and strains to which the wheel is now subjected, especially when heavily-laden draft-wagons are turned out of the car-track. The more recesses provided on the tire the more quickly of course the wheel will leave the groove; but for ordinary purposes it is not necessary to provide the tire with more than one or two recesses. When the wheel has turned sufficiently to enable the tire to enter the recess, the shoulder 14 at the forward end of the recess will operate like a step, and after the wheel has turned a little farther it will rise on the rail and easily pass thereover.

A wheel-tire can be provided with my invention at very little additional cost, and it will prevent the wheel from wearing rapidly.

While my invention is particularly adapted for enabling vehicles to readily move out of the grooves or depressions in railway-tracks, it will be apparent that it is equally useful in getting out of ruts and other places and other tracks where the wheel is closely confined.

Having thus fully described my invention, what I claim, and desire to secure by Letters Patent, is—

1. A wheel-tire provided with a depressed section in its side edge, and a recess in said section.

2. A wheel-tire provided with a depressed section in its side edge and a recess in said section of approximately the same depth throughout its length.

3. A wheel-tire provided with a depressed section in its side edge and a recess in said section of gradually-increasing width.

4. A wheel-tire provided with a depressed section in its side edge, and a recess in said section wider at its forward end than at its rear end.

5. A wheel-tire provided with a depressed section in its side edge and a recess in said section wider at its forward end than at its rear end and of approximately the same depth throughout.

6. A wheel-tire provided with a depressed section in its side edge, a diagonal recess in said section of approximately the same depth throughout its length, and an abrupt shoulder at the forward and wider end of said recess.

7. A wheel-tire provided with a depressed section in its side edge having a recess therein, the bottom of said section forming the bottom of the recess and being set into the felly of the wheel.

8. A wheel-tire provided with a depressed section in its side edge having a recess therein, the bottom of said section forming the bottom of the recess and being set into the felly of the wheel, and a shoulder at the forward end of the recess.

9. A wheel-tire provided with a depressed section in its side edge set into the felly, said section having a diagonally-cut recess therein wider at its forward end than at its rear end, a rectangular shoulder at the forward end of the recess, and a bottom for the recess rigid with the tire.

FRANK H. CHASE.

Witnesses:
WM. O. BELT,
HELEN L. PECK.